No. 660,424. Patented Oct. 23, 1900.
G. GORDON.
COVER HOLDER FOR VESSELS.
(Application filed June 28, 1900.)
(No Model.)
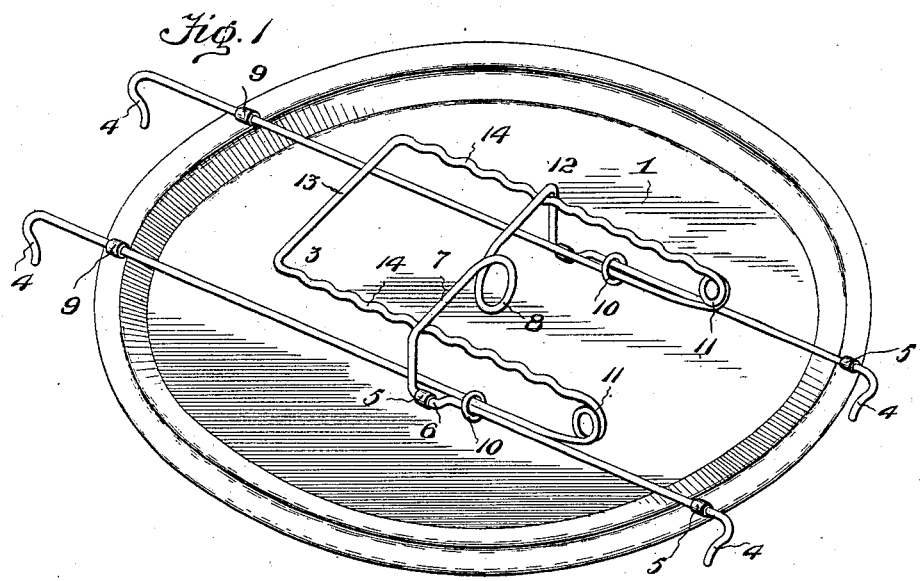
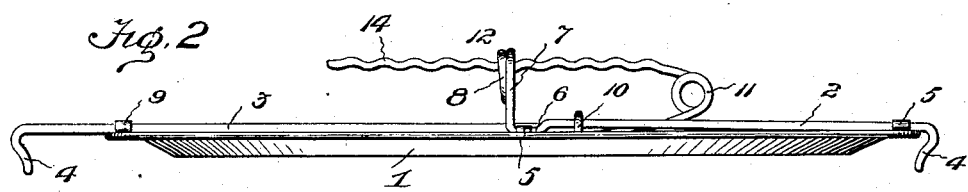
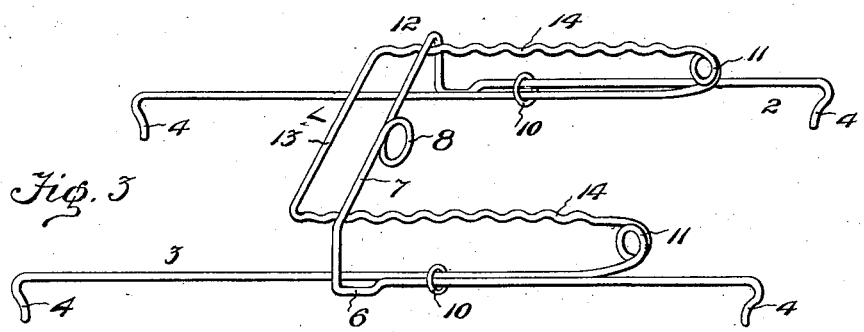
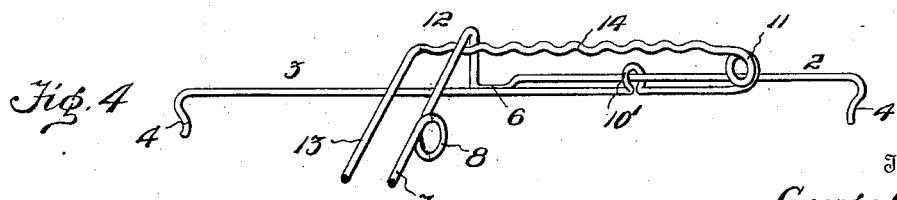
Witnesses
Inventor
George Gordon
by H. B. Willson & Co.
Attorneys

UNITED STATES PATENT OFFICE.

GEORGE GORDON, OF LUTHER, MICHIGAN.

COVER-HOLDER FOR VESSELS.

SPECIFICATION forming part of Letters Patent No. 660,424, dated October 23, 1900.

Application filed June 28, 1900. Serial No. 21,918. (No model.)

*To all whom it may concern:*

Be it known that I, GEORGE GORDON, a citizen of the United States, residing at Luther, in the county of Lake and State of Michigan, have invented certain new and useful Improvements in Lid or Cover Holders for Pots, Pans, and Vessels; and I do declare the following to be a full, clear, and exact description of the invention, such as will enable others skilled in the art to which it appertains to make and use the same.

My invention relates to a lid or cover holder for cooking pots, pans, and vessels; and one object is to provide an improved locking device for firmly holding the cover in place on the vessel to which it is applied, which device is adjustable for application to vessels and covers of different sizes and is adapted to be readily engaged with and released from the vessel without the necessity of the operator touching either the vessel or the cover.

A further object of the invention is to provide a pot or lid holder combining simplicity and cheapness of construction with durability and ease of operation and one in which the number of parts is reduced to a minimum.

In the accompanying drawings, Figure 1 is a perspective view of a lid or cover, showing the application of my invention thereto. Fig. 2 is a side elevational view of the same. Fig. 3 is a perspective view of the holder detached. Fig. 4 is a detail view showing a modification.

Referring now more particularly to the drawings, in which like reference characters designate corresponding parts throughout the several views, the numeral 1 represents a lid or cover of the usual form and of a diameter to fit upon the edge of an ordinary cooking pot or vessel.

My improved holder or locking device consists, essentially, of two bail-shaped sections 2 and 3, which may for convenience of description be termed the "fixed" section and the "adjustable" section. These parts are mounted to extend across the upper side of the vessel-cover and are provided at the extremities of their arms with corresponding hooks 4, adapted to engage the side and rim edge of the pot or vessel to retain the cover in position thereon, the hooks of one section being arranged to project beyond the edge of the cover at the side diametrically opposite the hooks of the other section. The fixed section 2 is rigidly secured to the cover by keepers or loops 5, closely embracing the arms thereof and passing through openings formed in the cover and clenched against the under side thereof. To insure the retention of the fixed section in its proper position, the inner ends of the arms thereof may be offset or bent downwardly, as at 6, and one set of the loops or keepers applied thereto, this construction resulting in the formation of shoulders to prevent inward displacement of the sections. The inner ends of the arms of the fixed section are bent upwardly and connected by a bridge or cross piece 7, formed with a central ring or loop 8 to receive the finger of the operator in manipulating the adjustable section, as hereinafter described.

The adjustable section 3 is slidably connected with the cover by guide loops or eyes 9, which are also passed through openings in the cover and clenched against the under side thereof, but embrace the arms of the adjustable section loosely, so as to allow the same to slide freely toward and from the fixed section. The arms of the adjustable section are mounted to slide between the arms of the fixed section and are connected therewith by rings or eyes 10, forming guides which hold the two sections connected and at the same time guide the back-and-forth movements of the adjustable section. At their inner ends the arms of the adjustable section are bent to form spring-coils 11 and are thence extended to form a bail-shaped locking device 12, the cross-bar or bridge-piece 13 of which constitutes a handle or finger-piece, whereby the adjustable section may be moved in and out in adjusting the holder for application to vessels of different sizes. The arms of the bail-shaped locking device move below the cross-bar or bridge-piece 7 of the fixed section and are bent to form corresponding serrations or rack-teeth 14 to engage said bar and hold the adjustable section locked in its adjusted position. The locking-bail is normally held pressed up into locking engagement with the said cross-bar of the fixed section by the spring-coils 11 and may be released from locking engagement by depressing the free end or cross-bar thereof to withdraw the serrated arms thereof from engagement with the cross-bar of the fixed section.

In operation the lid or cover is first placed upon the vessel, with the hooks of the fixed section engaging the side and rim edge thereof, and then the adjustable section is moved to bring its hooks in engagement with the side and rim edge of the vessel by depressing the locking-bail and forcing it inward, which may be conveniently effected by placing the middle or first finger of one hand in the ring or loop 8 and employing the thumb to actuate the locking-bail. The bail when thus moved forward slides through the guide rings or eyes 10 until the hooks of the adjustable section are brought firmly into locking engagement, when said adjustable section may be locked by releasing the locking-bail and allowing the arms thereof to be forced up into locking engagement with the cross-bar of the fixed section by the spring-coils.

Instead of employing independent guide loops, rings, or eyes 10, as shown in Figs. 1 to 3, inclusive, I may bend the arms of the fixed section or of the adjustable section, as preferred, to form integral loops or eyes 10' to engage the arms of the other section and slidably connect the two.

From the foregoing description, taken in connection with the accompanying drawings, the operation of the device will be readily understood, and it will be seen that it provides a simple and effective device for holding lids or covers of cooking pots or vessels firmly in position and that the device is adapted to be operated in a convenient manner without the necessity of touching the pot or cover and running the liability of burning or scalding the hands. The device is, furthermore, compact and simple of construction, as it practically embodies but two parts or sections, the locking-bail forming a part of the adjustable section.

Changes in the form, proportions, and minor details of construction may be resorted to within the scope of the invention without departing from the spirit or sacrificing any of the advantages thereof.

Having thus described my invention and pointed out its merits, what I claim, and desire to secure by Letters Patent, is—

1. In combination with a lid or cover for a vessel, a holding device, said device comprising two sections secured to the cover and having sliding engagement with each other, one of said sections being composed of resilient material and having its free end bent upon itself, said end adapted to engage frictionally the other section, whereby the two sections are held in adjusted position, substantially as set forth.

2. In combination with a lid or cover for a vessel, a holding device, said device comprising two sections secured to the cover and having sliding engagement with each other, one of said sections being composed of resilient material and having its free end bent upon itself to form a spring-actuated locking member, said member adapted to engage frictionally the other section, whereby the two sections are held in adjusted position, substantially as set forth.

3. In combination with a lid or cover for a vessel, a holding device, said device comprising two sections secured to the cover and having sliding engagement with each other, one of said sections having its inner end bent to form a keeper and the other having its inner end bent upon itself to form an outwardly-projecting locking device having spring-coils and adapted to frictionally engage said keeper, whereby the sections are held in adjusted position, and guides upon the keeper-section for said locking-section, substantially as set forth.

In testimony whereof I have hereunto set my hand in presence of two subscribing witnesses.

GEORGE GORDON.

Witnesses:
EDWARD DOUGHERTY,
WILL E. LINCOLN.